(12) United States Patent
Karafillis et al.

(10) Patent No.: US 8,926,270 B2
(45) Date of Patent: Jan. 6, 2015

(54) LOW-DUCTILITY TURBINE SHROUD FLOWPATH AND MOUNTING ARRANGEMENT THEREFOR

(75) Inventors: Apostolos Pavlos Karafillis, Winchester, MA (US); William Hasting, Cinicinnati, OH (US); Michael Hogan, Tewksbury, MA (US)

(73) Assignee: General Electric Company, Schenectady, NY (US)

( * ) Notice: Subject to any disclaimer, the term of this patent is extended or adjusted under 35 U.S.C. 154(b) by 578 days.

(21) Appl. No.: 12/971,893

(22) Filed: Dec. 17, 2010

(65) Prior Publication Data

US 2012/0156029 A1    Jun. 21, 2012

(51) Int. Cl.
F01D 25/28 (2006.01)
F01D 9/02 (2006.01)
F01D 11/08 (2006.01)

(52) U.S. Cl.
CPC *F01D 9/02* (2013.01); *F01D 11/08* (2013.01); *F05D 2250/75* (2013.01); *F05D 2260/38* (2013.01); *F05D 2300/518* (2013.01)
USPC ...................................................... 415/173.1

(58) Field of Classification Search
CPC ...... F06D 2260/38; F01D 11/08; F01D 25/28
USPC ................................................... 415/173.1
See application file for complete search history.

(56) References Cited

U.S. PATENT DOCUMENTS

| | | | |
|---|---|---|---|
| 3,825,364 A * | 7/1974 | Halila et al. .................. | 415/116 |
| 4,087,199 A * | 5/1978 | Hemsworth et al. ....... | 415/173.3 |
| 5,064,727 A | 11/1991 | Naik et al. | |
| 5,074,748 A | 12/1991 | Hagle | |
| 5,145,316 A * | 9/1992 | Birch ........................... | 415/173.1 |
| 5,154,577 A | 10/1992 | Kellock et al. | |
| 5,188,507 A * | 2/1993 | Sweeney ...................... | 415/173.1 |
| 5,655,876 A | 8/1997 | Rock et al. | |
| 6,290,459 B1 | 9/2001 | Correia | |
| 6,340,285 B1 | 1/2002 | Gonyou et al. | |
| 6,413,042 B2 | 7/2002 | Correia | |
| 6,503,051 B2 | 1/2003 | Predmore | |
| 6,726,448 B2 | 4/2004 | McGrath et al. | |
| 6,733,233 B2 | 5/2004 | Jasklowski et al. | |
| 7,596,954 B2 * | 10/2009 | Penda et al. .................... | 60/782 |
| 2002/0150469 A1 * | 10/2002 | Bolms ........................... | 415/115 |
| 2008/0206046 A1 | 8/2008 | Razzell et al. | |

OTHER PUBLICATIONS

Shapiro, et al., U.S. Appl. No. 12/696,566, filed Jan. 29, 2010.
Marusko, et al., U.S. Appl. No. 12/790,209, filed May 28, 2010.
Albers, et al., U.S. Appl. No. 12/821,599, filed Jun. 23, 2010.
Dziech, et al., U.S. Appl. No. 12/895,007, filed Sep. 30, 2010.
Albers, et al., U.S. Appl. No. 12/915,424, filed Oct. 29, 2010.

* cited by examiner

*Primary Examiner* — Ned Landrum
*Assistant Examiner* — Brian O Peters
(74) *Attorney, Agent, or Firm* — William Scott Andes; Trego, Hines & Ladeheim, PLLC

(57) ABSTRACT

A turbine flowpath apparatus is provided for a gas turbine engine having a centerline axis. The apparatus includes: an annular flowpath member of low-ductility material, the flowpath member having a flowpath surface and an opposed back surface, and having a cross-sectional shape comprising a generally cylindrical forward section and an aft section that extends aft and radially outward at a non-perpendicular, non-parallel angle to the centerline axis; an annular stationary structure surrounding the flowpath member; and an annular centering spring disposed between the stationary structure and the flowpath member, the centering spring urging the flowpath member towards a centered position within the stationary structure.

10 Claims, 5 Drawing Sheets

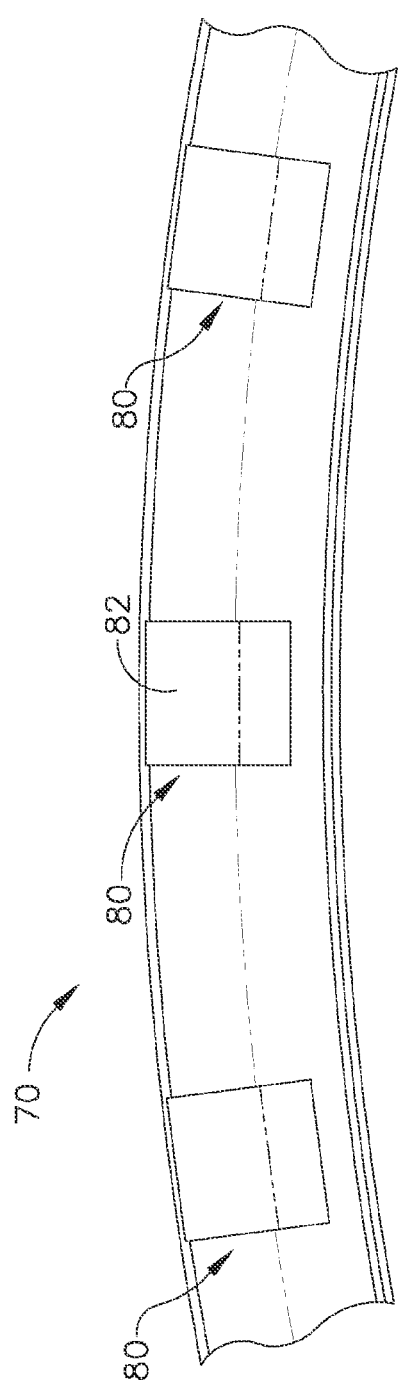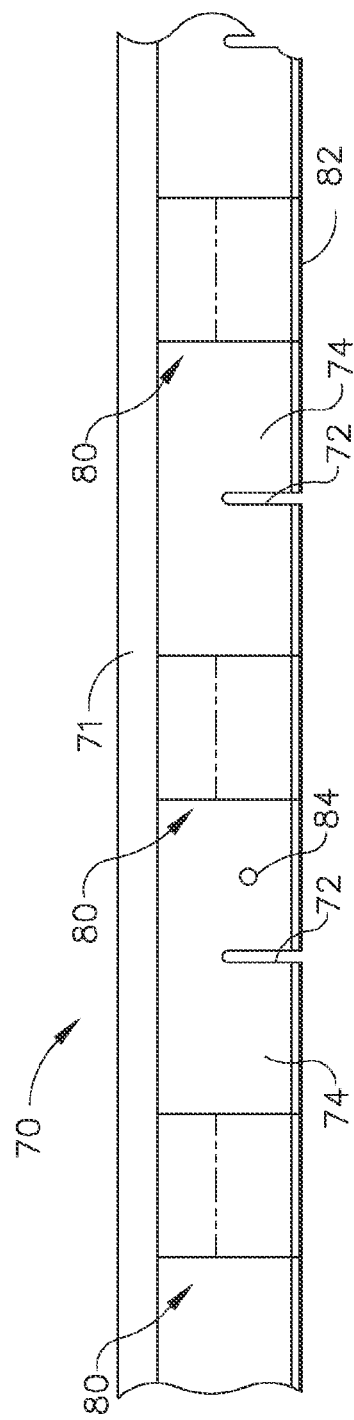
FIG. 4
FIG. 5

LOW-DUCTILITY TURBINE SHROUD FLOWPATH AND MOUNTING ARRANGEMENT THEREFOR

STATEMENT REGARDING FEDERALLY SPONSORED RESEARCH AND DEVELOPMENT

The U.S. Government may have certain rights in this invention pursuant to contract number W911W6-07-2-0002 awarded by the Department of the Army.

BACKGROUND OF THE INVENTION

This invention relates generally to gas turbine engines, and more particularly to turbine flowpath components made of a low-ductility material in the turbine sections of such engines.

A typical gas turbine engine includes one or more turbine rotors which extract energy from the primary gas flow. Each rotor comprises an annular array of blades or buckets carried by a rotating disk. The flowpath through the rotor is defined in part by a shroud, which is a stationary structure which circumscribes the tips of the blades or buckets. These components operate in an extremely high temperature environment, and must be cooled by air flow to ensure adequate service life. Typically, the air used for cooling is extracted (bled) from the compressor. Bleed air usage negatively impacts specific fuel consumption ("SFC") and should generally be minimized.

It has been proposed to replace metallic shroud structures with materials having better high-temperature capabilities, such as ceramic matrix composites (CMCs). These materials have unique mechanical properties that must be considered during design and application of an article such as a shroud segment. When compared with metallic materials, CMC materials have relatively low tensile ductility or low strain to failure, and a low coefficient of thermal expansion ("CTE").

CMC materials expand at different rates than surrounding metallic hardware, and are not as suitable as metals for forming small-scale mounting features such as hooks, grooves, rails, and the like. Conventional mechanical clamped joints are sometimes dependent on frictional forces which can be inconsistent when using a combination of metallic and CMC materials.

Accordingly, there is a need for a turbine flowpath structure which is light weight and high-temperature resistant, with a predictable mounting configuration.

BRIEF SUMMARY OF THE INVENTION

This need is addressed by the present invention, which provides a turbine flowpath structure that serves as both a turbine shroud and a transition duct. The flowpath structure is made from a low-ductility material that does not require air cooling, and is trapped in place by surrounding hardware and centered by spring forces.

According to one aspect of the invention, a turbine flowpath apparatus is provided for a gas turbine engine having a centerline axis. The apparatus includes: an annular flowpath member comprising low-ductility material, the flowpath member having a flowpath surface and an opposed back surface, and having a cross-sectional shape comprising a generally cylindrical forward section and an aft section that extends aft and radially outward at a non-perpendicular, non-parallel angle to the centerline axis; an annular stationary structure surrounding the flowpath member; and an annular centering spring disposed between the stationary structure and the flowpath member, the centering spring urging the flowpath member towards a centered position within the stationary structure.

According to another aspect of the invention, a turbine flowpath apparatus is provided for a gas turbine engine having a centerline axis. The apparatus includes: an annular shroud support; an annular shroud hanger engaged with the shroud support; an annular flowpath member comprising low-ductility material, the flowpath member having a flowpath surface and an opposed back surface, and having a cross-sectional shape comprising a generally cylindrical forward section and an aft section that extends aft and radially outward at a non-perpendicular, non-parallel angle to the centerline axis, where a forward end of the flowpath member abuts the hanger; an annular turbine case surrounding the flowpath member and the shroud support; and an annular centering spring disposed between the turbine case and the flowpath member, the centering spring urging the flowpath member towards a centered position within the turbine case.

BRIEF DESCRIPTION OF THE DRAWINGS

The invention may be best understood by reference to the following description taken in conjunction with the accompanying drawing figures in which:

FIG. 4 is a partial front elevation view of a centering spring shown in FIG. 2; and FIG. 5 is top view of the centering spring of FIG. 4.

DETAILED DESCRIPTION OF THE INVENTION

Figure 1:
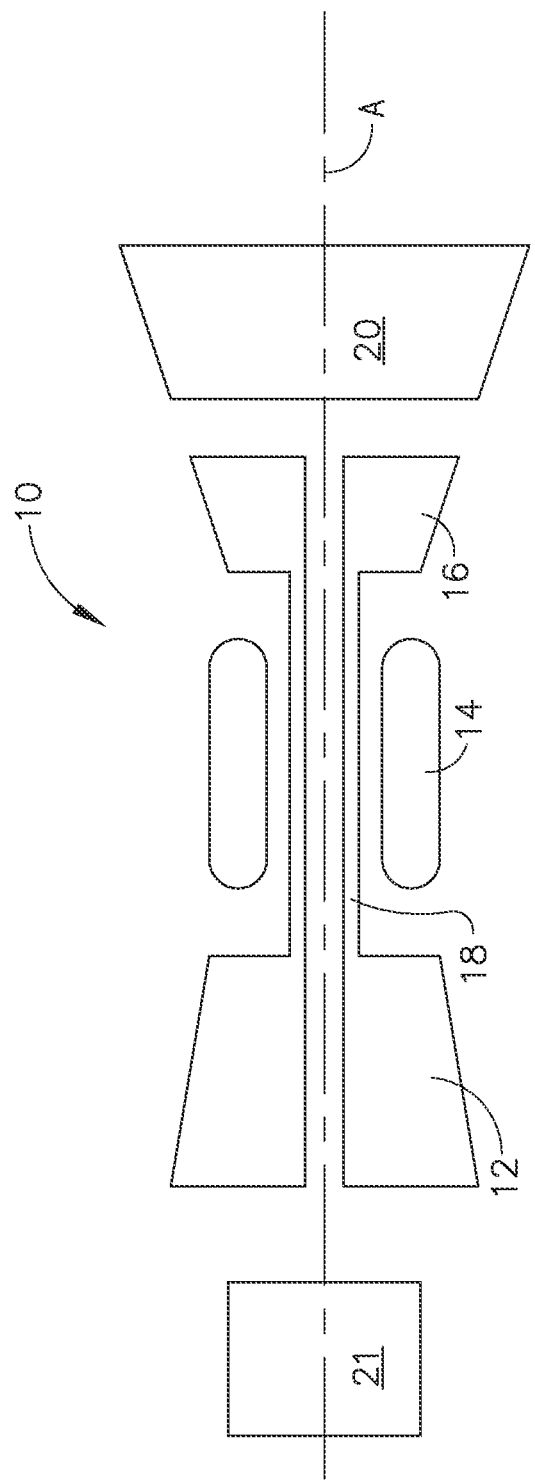
FIG. 1 is a schematic diagram of a gas turbine engine incorporating a turbine shroud and mounting apparatus constructed in accordance with an aspect of the present invention.

Referring to the drawings wherein identical reference numerals denote the same elements throughout the various views, FIG. 1 depicts schematically the elements of an exemplary gas turbine engine 10 having a compressor 12, a combustor 14, and a high pressure or gas generator turbine ("GGT") 16, all arranged in a serial flow relationship along a centerline axis "A". As used herein, the terms "axial" or "longitudinal" refer to a direction parallel to the axis A, while the term "radial" refers to a direction perpendicular to the axis A. Collectively the compressor 12, the combustor 14, and the GGT 16 are referred to as a "core". The compressor 12 provides compressed air that passes into the combustor 14 where fuel is introduced and burned, generating hot combustion gases. The hot combustion gases are discharged to the GGT 16 where they are expanded to extract energy therefrom. The GGT 16 drives the compressor 12 through a shaft 18. Pressurized air exiting from the GGT 16 is discharged to a low pressure turbine or power turbine ("LPT") 20 where it is further expanded to extract energy. The power turbine 20 is coupled to an external mechanical load such as a shaft, gearbox, or propeller (depicted schematically at block 21 in FIG. 1).

While the illustrated engine 10 is a turboshaft engine, the principles described herein are equally applicable to turbojet and turbofan engines, as well as turbine engines used for other vehicles or in stationary applications. Furthermore, while a GGT shroud structure is used as an example, it will be understood that the principles of the present invention may be applied to any turbine airfoil having shrouds, including without limitation high-pressure turbine ("HPT") and intermediate-pressure turbine ("IPT") blades. Furthermore, the principles described herein are also applicable to turbines using working fluids other than air, such as steam turbines.

Figure 2:
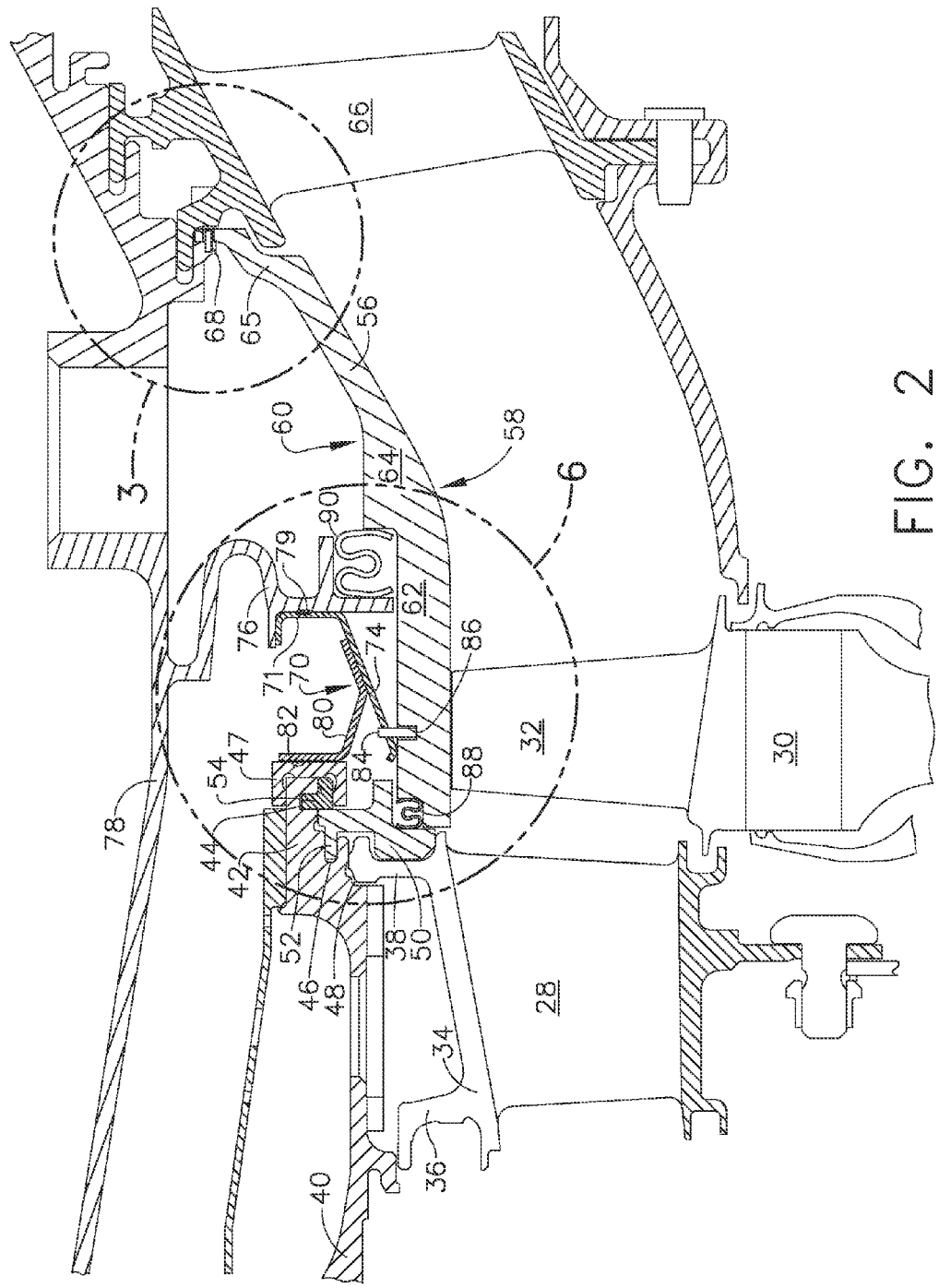
FIG. 2 is an enlarged view of a turbine section of the engine shown in FIG. 1.

Referring to FIG. 2, the GGT 16 includes a nozzle comprising a plurality of circumferentially spaced airfoil-shaped hollow vanes 28, and a rotor comprising a rotating disk 30 that carries an array of airfoil-shaped turbine blades 32. In this example the vanes 28, disk 30, and turbine blades 32 comprise the second of two axial stages in the GGT 16; however the principles of the present invention are equally applicable to single-stage turbines or any stage of a multiple-stage turbine.

The vanes 28 are bounded at their tips by an annular outer band 34. An annular forward rail 36 with a forward-facing L-shaped cross-section extends radially outward from a forward end of the outer band 34, and an annular aft rail 38 with an aft-facing L-shaped cross-section extends radially outward from an aft end of the outer band 34.

The vanes 28 are surrounded by and mounted to a stationary, annular shroud support 40. The aft portion of the shroud support 40 includes, in axial sequence beginning at its aft end and proceeding forward, an annular boss 42 with a radially-extending retaining ring groove 44 formed in its inner surface, an annular, aft-facing hanger groove 46, and an annular slot 48 which receives the aft rail 38 of the vane 28.

An annular hanger 50 abuts the aft end of the aft rail 38. The hanger 50 includes a forward-facing hook 52 which engages the hanger groove 46. Thus assembled, the hanger 50 clamps the aft rail 38 to the shroud support 40 in the radial direction.

An annular retaining 54 with an L-shaped cross-section is installed against the inner surface of the shroud support 40, with one leg of the "L" in the retaining ring groove 44. The retaining ring 54 extends radially inward sufficiently far to overlap the hanger 50 in the radial direction and abut the hanger 50, thereby preventing the hanger from moving aft and disengaging the hanger groove 46.

A resilient, annular retainer 47 having a C-shaped cross-section, commonly referred to as a "C-clip", is mounted over the boss 42 of the shroud support 40 and the retaining ring 54, clamping them together.

The above-noted components may all be constructed of known metallic alloys suitable for use in gas turbine engines, for example known nickel-, cobalt-, or iron-based superalloys. Such alloys are available commercially under trade names such as RENE, INCO, and WASPALLOY.

An annular flowpath member 56 surrounds the turbine blades 32. It serves the functions of both a conventional turbine shroud and a conventional outer transition duct. The flowpath member 56 has a flowpath surface 58 and opposed back surface 60 and includes, from front to rear, a generally cylindrical forward section 62 and an aft section 64 that extends aft and radially outward at a non-perpendicular, non-parallel angle to the axis A. The forward section 62 surrounds the turbine blades 32 and defines part of the flowpath through the blades. An annular aft flange 65 extends radially outward at the aft end of the flowpath member 56. The forward end of the flowpath member 56 abuts the hanger 50 and the aft flange 65 abuts the downstream nozzle 66 of the power turbine 20. Collectively these locate the flowpath member 56 in the axial direction.

Figure 3:
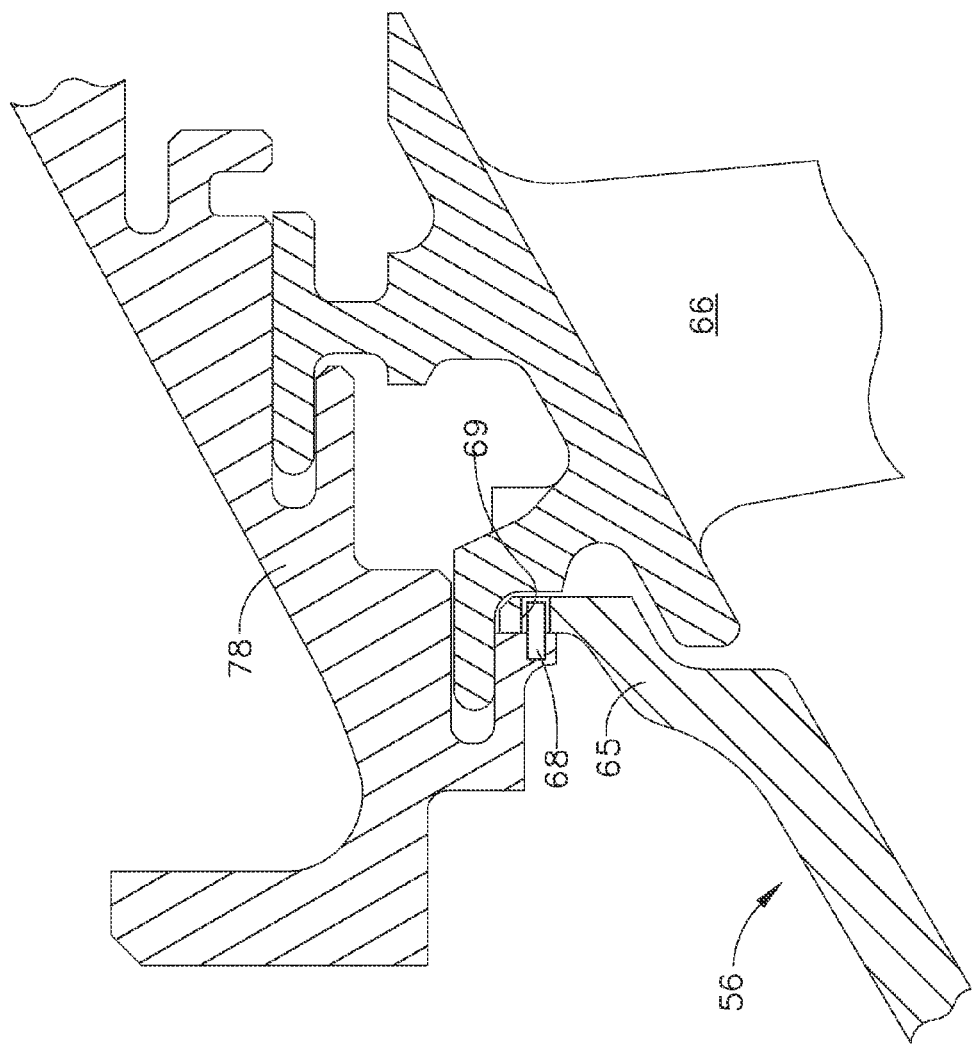
FIG. 3 is a cross-sectional view of a portion of FIG. 2, shown in the installation of axial pins in the turbine section.

The flowpath member 56 is mounted so that it can expand or contract in diameter (e.g. radial compliance) while being restrained against rotation relative to the turbine case 78 that surrounds it. Various types of mechanical structures may be used to provide this restraint. One configuration is seen in FIG. 3, where axial pins 68 fixed in the turbine case 78 extend aft into radial slots 69 formed in the aft flange 65 of the flowpath member 56. When at least three equally-spaced axial pins 68 are used, the flowpath member 56 is also completely restrained against lateral deflection, i.e. held concentric to the turbine case 78.

The flowpath member 56 is constructed from a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals having a room temperature tensile ductility of at least about 5%, for example in the range of about 5 to about 15%. The flowpath member 56 could also be constructed from other low-ductility, high-temperature-capable materials.

Optionally, all or part of the flowpath surface 58 may incorporate a layer of an environmental coating, or an abradable or rub-tolerant material of a known type suitable for use with CMC materials.

Referring back to FIG. 2, the flowpath member 56 is located in the radial direction by a metallic, annular centering spring 70. The centering spring 70 has a generally frustoconical shape with its smaller diameter at its forward end and a radially-outwardly-extending, L-shaped flange 71 at its aft end. As best seen in FIGS. 4 and 5, the forward portion of the centering spring 70 is divided by slots 72 into an array of resilient spring fingers 74. The centering spring 70 is trapped between an annular rim 76 which is part of the turbine case 78, and the flowpath member 56 itself. In the installed position, the spring fingers 74 bear against the flowpath member 56. Each individual spring finger 74 urges the flowpath member 56 radially inward, with the complete ring of spring fingers 74 keeping the flowpath member 56 in a centered position. The characteristics of the centering spring 70, such as the material, temper, dimensions, etc. may be varied as required to provide a desired preload or centering force on the flowpath member 56.

An array of spring tabs 80 extend axially forward and radially outward from the body of the centering spring 70. Each spring tab 80 has a radially-aligned flange 82 which bears against the C-clip 47 in an axial direction. The centering spring 70 reacts axially against the rim 76 of the turbine case 78, so the spring tabs 80 serve to urge the C-clip 47 forward and prevent it from backing off from its installed position.

The centering spring 70 is fixed against rotation relative to the turbine case 78. In the illustrated example, tack welds 79 are applied between the flange 71 and the annular rim 76 of the turbine case 78. Alternate means of preventing rotation such as a mechanical joint or mechanical fasteners may be used instead.

Figure 6:
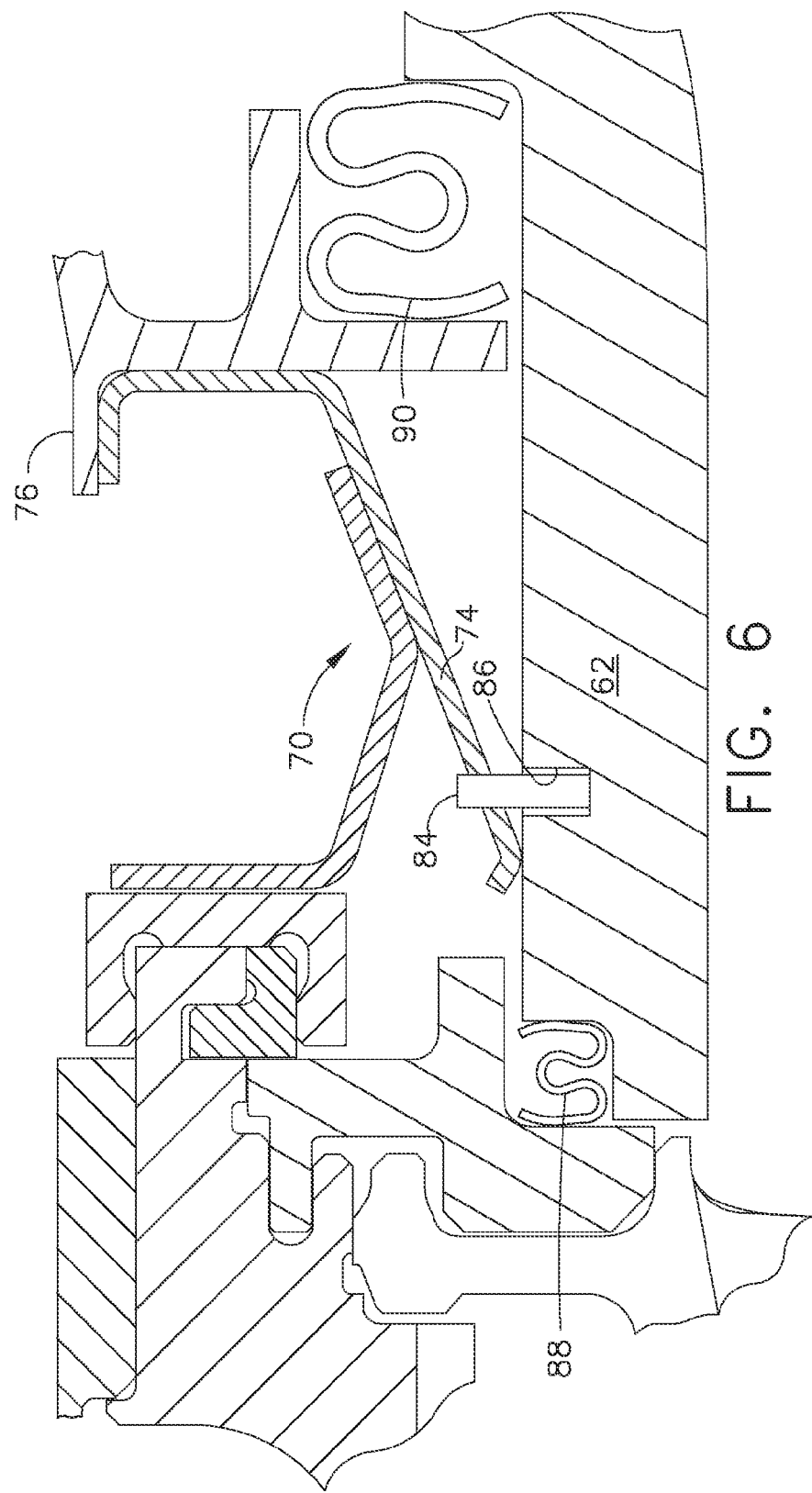
FIG. 6 is an enlarged view of a portion of FIG. 2, showing the installation of radial pins in the turbine section.

An alternative method of restraining the flowpath member is seen in FIG. 6. Radial pins 84 are received in slots 86 machined in the flowpath member 56. The pins 84 extend through holes in the centering spring 70 and are fixed thereto, for example by tack welds. The radial pins 84 allow for differential thermal growth between the flowpath member 56 and the centering spring 70, but prevent transverse shroud movements during maneuvers or heavy rubs, and also prevent relative rotation of the flowpath member 56 to the centering spring 70, and thus the turbine case 78. When at least three equally-spaced radial pins 84 are used, the flowpath member 56 is completely restrained against lateral deflection, i.e. held concentric to the turbine case 78.

Resilient annular metallic seals having convoluted cross-sections, commonly referred to as "W-seals", may be provided to prevent air leakage between the flowpath member 56 and the surrounding structure. Examples of W-seals are shown as items 88 and 90 in FIG. 2.

The shroud configuration described herein has several advantages over conventional configurations. The flowpath member 56 provides a flowpath surface that can operate without air cooling, providing cycle performance benefits. Furthermore, there are no sectors, as the part is an axisymmetric, mechanically-trapped structure. This provides weight reduction benefits, as does the elimination of a separate shroud and duct structure. It also is expected that thermal stress in the flowpath member will be low due to the low thermal expansion coefficient of the CMC material.

The foregoing has described a turbine flowpath structure and mounting apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine flowpath apparatus for a gas turbine engine having a centerline axis, the apparatus comprising:
   an annular flowpath member comprising low-ductility material, the flowpath member having a primary flowpath surface and an opposed back surface, and having a cross-sectional shape including the flowpath surface comprising a generally cylindrical forward section and an aft section, wherein substantially all of the aft section extends aft and radially outward at a non-perpendicular, non-parallel angle to the centerline axis;
   an annular stationary structure surrounding the flowpath member;
   an annular centering spring disposed between the stationary structure and the flowpath member, the centering spring urging the flowpath member towards a centered position within the stationary structure, wherein the centering spring has a generally frustoconical shape with a radially-outwardly-extending, L-shaped flange at one axial end;
   wherein radial pins are fixed to the centering spring and extend into corresponding slots formed in the back surface of the flowpath member, so as to prevent relative lateral movement and relative rotation of the flowpath member and the centering spring; and
   a rotor comprising a rotatable disk that carries an array of airfoil-shaped turbine blades, wherein the forward section of the flowpath member surrounds the turbine blades and defines a portion of a flowpath through the turbine blades.

2. The apparatus of claim 1 wherein the flowpath member comprises a ceramic matrix composite material.

3. The apparatus of claim 1 wherein the centering spring includes an annular array of resilient spring fingers separated by generally axially-aligned slots.

4. The apparatus of claim 1 further including axial pins fixed to the stationary structure and extending into corresponding slots formed in a flange of the flowpath member, so as to prevent relative lateral movement and relative rotation of the flowpath member and the stationary structure.

5. A turbine flowpath apparatus for a gas turbine engine having a centerline axis, the apparatus comprising:
   an annular shroud support;
   an annular shroud hanger engaged with the shroud support;
   an annular flowpath member comprising low-ductility material, the flowpath member having a primary flowpath surface and an opposed back surface, and having a cross-sectional shape including the flowpath surface comprising a generally cylindrical forward section and an aft section, wherein substantially all of the aft section extends aft and radially outward at a non-perpendicular, non-parallel angle to the centerline axis, where a forward end of the flowpath member abuts the hanger;
   an annular turbine case surrounding the flowpath member and the shroud support;
   an annular centering spring disposed between the turbine case and the flowpath member, the centering spring urging the flowpath member towards a centered position within the turbine case, wherein the centering spring includes an annular array of resilient spring fingers separated by generally axially-aligned slots;
   wherein radial pins are fixed to the centering spring and extend into corresponding slots formed in the back surface of the flowpath member, so as to prevent relative lateral movement and relative rotation of the flowpath member and the centering spring; and
   a rotor comprising a rotatable disk that carries an array of airfoil-shaped turbine blades, wherein the forward section of the flowpath member surrounds the turbine blades and defines a portion of a flowpath through the turbine blades.

6. The apparatus of claim 5 wherein the flowpath member comprises a ceramic matrix composite material.

7. The apparatus of claim 5 wherein the centering spring has a generally frustoconical shape with a radially-outwardly-extending, L-shaped flange at one axial end.

8. The apparatus of claim 5 wherein the flowpath member includes an aft flange which extend radially outward from an aft end thereof, the aft flange abutting an axially down-stream turbine nozzle.

9. The apparatus of claim 8 further including axial pins fixed to the turbine case and extending into corresponding slots formed in the aft flange of the flowpath member, so as to prevent relative lateral movement and relative rotation of the flowpath member and the turbine case.

10. A turbine flowpath apparatus for a gas turbine engine having a centerline axis, the apparatus comprising:
   an annular shroud support;
   an annular shroud hanger engaged with the shroud support;
   an annular flowpath member comprising low-ductility material, the flowpath member having a primary flowpath surface and an opposed back surface, and having a cross-sectional shape including the flowpath surface comprising a generally cylindrical forward section and an aft section, wherein substantially all of the aft section extends aft and radially outward at a non-perpendicular, non-parallel angle to the centerline axis, where a forward end of the flowpath member abuts the hanger;
   an annular turbine case surrounding the flowpath member and the shroud support;
   an annular centering spring disposed between the turbine case and the flowpath member, the centering spring urging the flowpath member towards a centered position within the turbine case, wherein the centering spring includes spring tabs which abut the annular retainer, such that the centering spring urges the retainer axially against the shroud support;

a rotor comprising a rotatable disk that carries an array of airfoil-shaped turbine blades, wherein the forward section of the flowpath member surrounds the turbine blades and defines a portion of a flowpath through the turbine blades;

a retaining ring engaging a groove in the shroud support and axially abutting the hanger; and a resilient, annular retainer having a C-shaped cross-section clamping the shroud support and the retaining ring together.

* * * * *